US005245497A

United States Patent [19]

Shibui et al.

[11] Patent Number: 5,245,497

[45] Date of Patent: Sep. 14, 1993

[54] TRANSFORMER

[75] Inventors: Seiki Shibui, Chohu; Masaaki Sano, Itabashi, both of Japan

[73] Assignee: Nippon Desan Corporation, Kyoto, Japan

[21] Appl. No.: 734,899

[22] Filed: Jul. 24, 1991

[30] Foreign Application Priority Data

Jul. 31, 1990 [JP] Japan .................... 2-204334
Oct. 31, 1990 [JP] Japan .................... 2-296445

[51] Int. Cl.[5] .................... H02H 7/04

[52] U.S. Cl. .................... 361/40; 361/117

[58] Field of Search .................... 361/38, 39, 40, 118, 361/111, 117; 336/192, 198

[56] References Cited

U.S. PATENT DOCUMENTS 2,220,615 11/1940 Pittman .................... 361/40
3,691,425 9/1972 Weyrich et al. .................... 361/40

*Primary Examiner*—A. D. Pellinen
*Assistant Examiner*—S. Jackson
*Attorney, Agent, or Firm*—McCormick, Paulding & Huber

[57] ABSTRACT

A transformer including a bobbin having a primary winding frame and a secondary winding frame, a primary coil wound around the primary winding frame, a secondary coil wound around the secondary winding frame, a pair of connection pins electrically connected to a power source A projection which can be broken or bent is provided on the bobbin. The wire of the primary coil is hitched over the projection and then wound to form the primary coil, and the projection is therafter broken or bent to loosen the primary coil. A discharge means is also provided to cause a discharge between the pair of connection pins when a high voltage is applied therebetween.

3 Claims, 6 Drawing Sheets

TRANSFORMER

BACKGROUND OF THE INVENTION

This invention relates to a transformer for use in an AC-DC converter or the like.

In general, a transformer is formed of a bobbin having a primary winding frame and a secondary winding frame, a primary coil wound around the primary winding frame, and a secondary coil wound around the secondary winding frame. A pair of connection pins are provided on the bobbin, and two ends of primary coil are respectively connected electrically to the corresponding connection pins. In this transformer, a pair of connection pins are connected to a domestic power supply line (of AC 100 V, for example), and the input voltage is reduced by the primary and secondary coils to obtain a predetermined necessary voltage through output terminals of the secondary coil (which is converted into a direct current if necessary).

To manufacture such a transformer, the primary and secondary coils are respectively wound around the primary and secondary winding frames by an automatic winding machine. However, if an automatic winding machine is used, the primary and secondary coils are wound in a tensed state, and there is a risk of disconnection of the primary and secondary coils by extension or contraction thereof caused by a change in atmospheric temperature or the like. The amount of heat developed in the primary coil is particularly large because a comparatively high voltage is applied to the primary coil, and the risk of disconnection of the primary coil is considerably high.

The pair of connection pins of such a transformer is electrically connected to a plug receptacle of domestic electric power supply. However, there is the problem of deterioration of the insulating performance of the transformer coils, in particular that of the primary coil, or occurrence of short-circuit between the primary and secondary coils when a very high voltage caused by, for example, lightning is applied to the domestic power supply line.

SUMMARY OF THE INVENTION

It is an object of the present invention to provide a transformer improved in reliability with respect to prevention of disconnection of the primary coil.

It is another object of the present invention to provide a transformer in which the primary and secondary coils can be securely protected when a very high voltage is applied to the pair of connection pins.

Other objects and features of the present invention will be readily understood from the following description of the invention.

DESCRIPTION OF THE PREFERRED EMBODIMENTS

Figure 1:
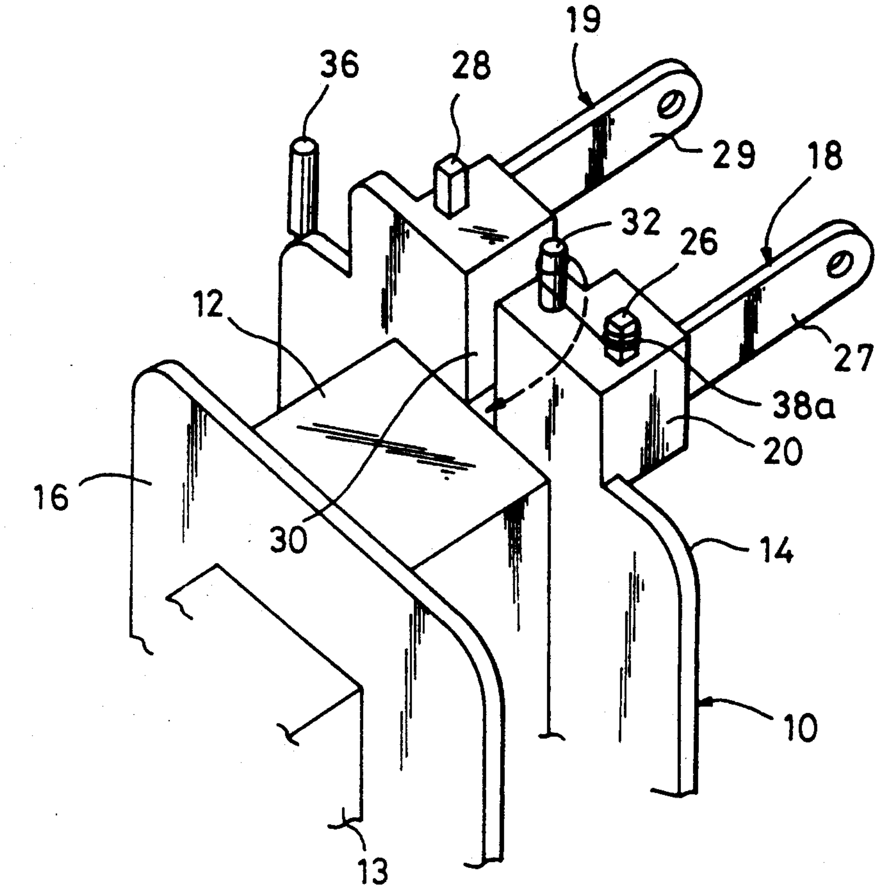
FIG. 1 is a fragmentary perspective view o a bobbin of a transformer in accordance with a first embodiment of the present invention.

The present invention will be described below in detail with reference to the accompanying drawings.

First Embodiment

FIGS. 1 to 4 show a transformer in accordance with the first embodiment of the present invention.

The transformer shown in FIGS. 1 to 4 has a bobbin 10 which may be formed of an insulating synthetic resin, e.g., polyethylene terephthalate.

The bobbin 10 has a primary winding frame 12 and a secondary winding frame 13 which are hollow and rectangular in section. A front partition wall 14 is provided on the primary winding frame 13 at one end (front end), an intermediate partition wall 16 is provided at the other end (one end of the secondary winding frame 13), and a rear partition wall (not shown) is provided at the other end (rear end) of the secondary winding frame 13. That is, the primary winding frame 12 is provided between the front partition wall 14 and the intermediate partition wall 16, and the secondary winding frame 13 is provided between the intermediate partition wall 16 and the rear partition wall. A primary coil 40 is wound around the primary winding frame 12, and a secondary coil 41 is wound around the secondary winding frame 13.

A projecting support 20 is formed integrally with an upper portion of the front partition wall 12, and a pair of connection pins 18 and 19 are provided on the projecting support 20 at a certain distance from each other. Base portions 24 and 25 of the connection pins 18 and 19 are formed so as to be L-shaped as indicated by the broken line in FIG. 2 and are embedded in the projecting support 20. The connection pins 18 and 19 have terminal portions 26 and 28 and connection portions 27 and 29, respectively. The terminal portions 26 and 28 extend upward from the base portions 24 and 25 to protrude beyond upper surfaces of the projecting support 20. The connection portions 27 and 29 extend forward from the base portions 24 and 25 to protrude beyond front surfaces of the projecting support 20, and are capable of being electrically connected to, for example, a plug receptacle (not shown) for domestic AC 100 V electric power supply. The terminal portion 26 of the connection pin 18 is used as a terminal from which winding is started, while the terminal portion 28 of the other connection pin 19 is used as a terminal at which winding is terminated. A rectangular cut 30 is formed in an intermediate portion of the projecting support 20. The rectangular cut 30 serves as a lead-out slit. In relation to the cut 30, a first guide projection 32 is provided on one of the upper surfaces of the projecting support 20, and a step 31 is formed in one surface of the projecting support defining one side of the cut 30. A second guide projection 34 is provided on the front surface of the step 31.

In this embodiment, a projection 36 is further provided on the front partition wall 14. The wire of the coil 40 can be hitched over the projection 36 after being wound around the primary winding frame 12 and before being connected to the winding end terminal portion 28. The projection 36 is formed so that it can be easily broken by hand or by a machine. To make the projection 36 easy to break or bend, the material and shape of the projection 36 and/or the sectional area of the portion to be broken or bent may be selected. In this embodiment, a base end portion of the projection 36 is previously cut so that the thickness thereof is reduced.

The projection 36 is formed integrally with an upper corner portion of the front partition wall 14 at a predetermined distance from the winding end terminal portion 28 projecting from the projecting support 20. The position of the projection 36 is such that it deviates from the shortest course through which the end of the coil 40 wound around the primary winding frame 12 is to be led when connected to the winding end terminal portion 28, and such that the spacing between the projecting support 20 and the projection 36 allows a winding end portion 38*b* of the coil 40 connected to the winding end terminal portion 28 via the projection 36 to be loosened by breaking or bending of the projection 36.

Figure 2:
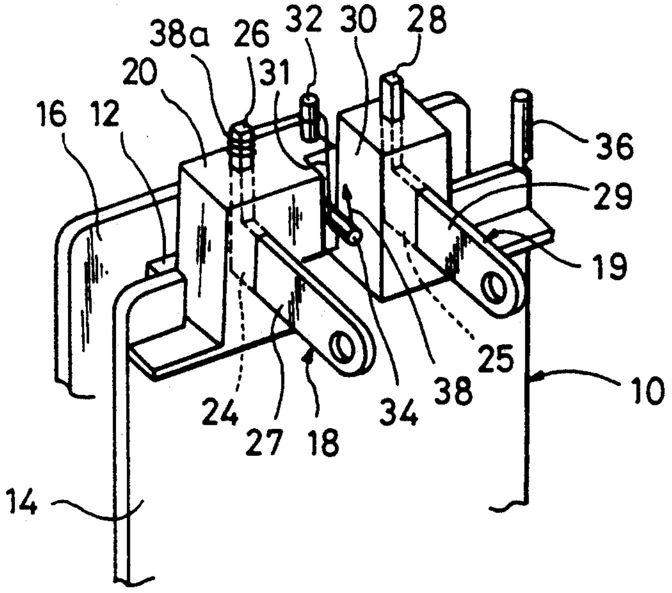
FIG. 2 is a front perspective view of the bobbin shown in FIG. 1.

The coils are wound around the bobbin 10 to manufacture the transformer by using, for example, an automatic winding machine, as described below. As shown in FIGS. 1 and 2, a start end portion 38*a* of the coil 40 is connected to the winding start terminal portion 26 by lapping, and the wire 38 of the coil is thereafter led to a position on an outer peripheral surface of the primary winding frame 12 via the first guide projection 32 and the second guide projection 34 and through a lower section of the cut 30, as indicated by the arrow.

Figure 3:
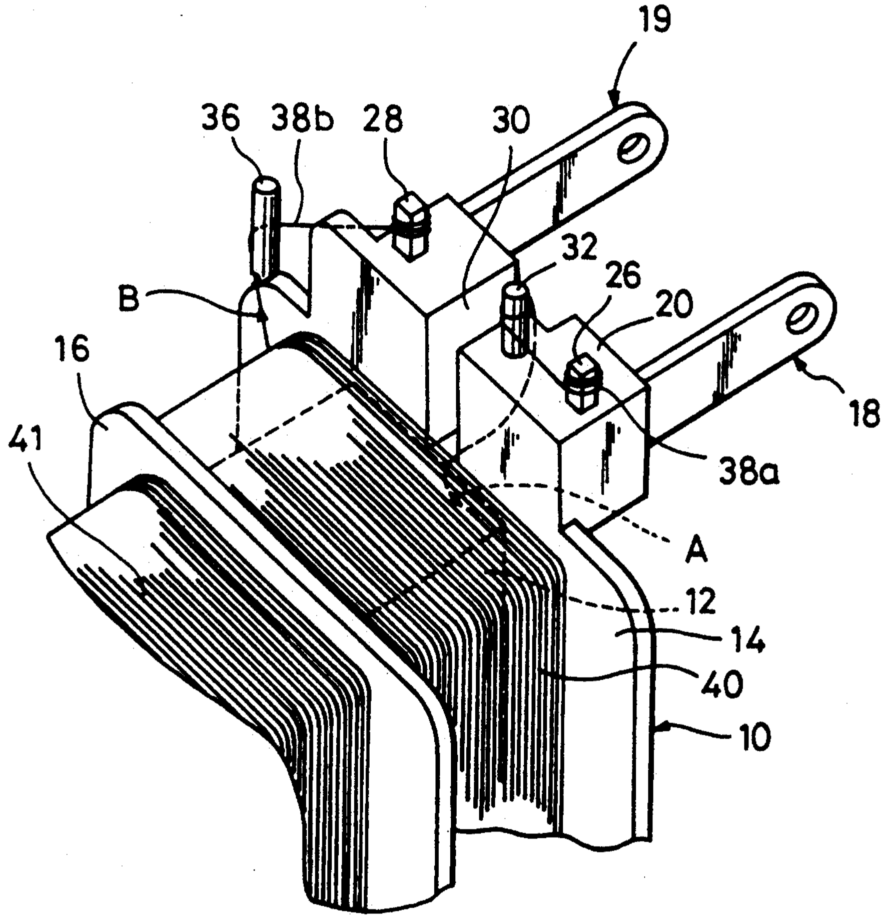
FIG. 3 is a perspective view of the method of winding a primary coil around a primary winding frame of the bobbin shown in, FIG. 1.

Next, as indicated by the arrow A in FIG. 3, the primary coil 40 is wound around the primary winding frame 12 and, after winding, the winding end portion 38*b* of the coil 40 is hitched over the projection 36 and is connected by lapping to the winding end terminal portion 28 via the projection 36, as indicated by the arrow B. In this state, the winding end portion 38*b* connected to the winding end terminal portion 28 after winding is tensed.

Figure 4:
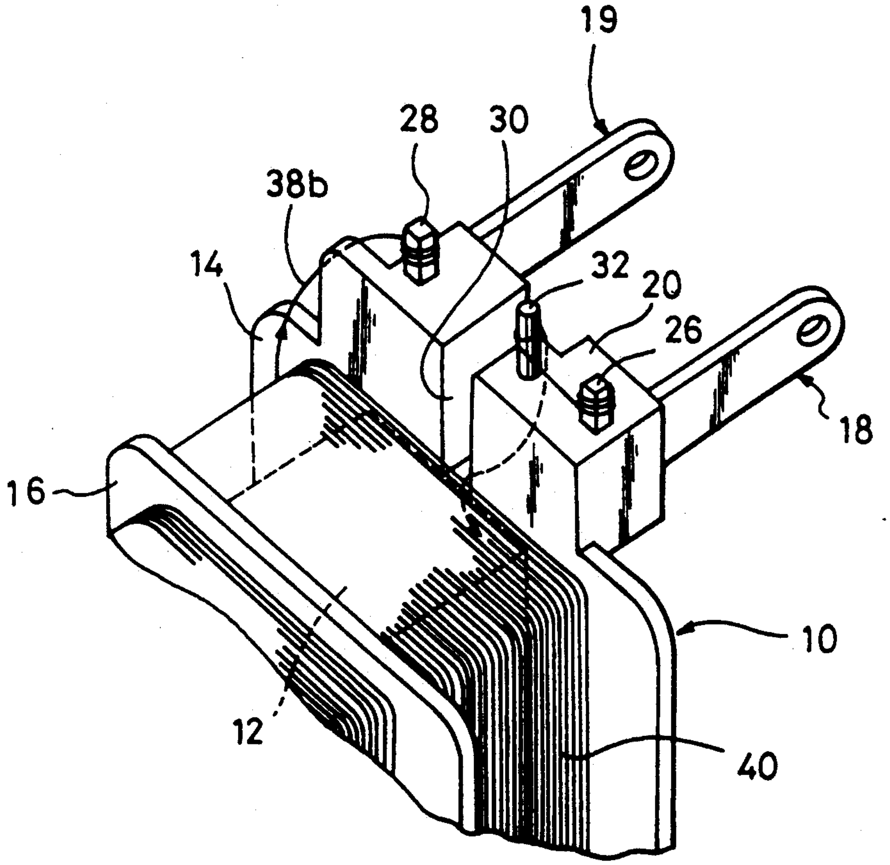
FIG. 4 is a perspective view of a state in which the projection is broken after winding the primary coil around the primary winding frame.

In this state, the projection 36 is bent and broken in a direction such that the tensile force caused in the winding end portion 38*b* of the coil 40 is not increased, e.g., toward the winding end terminal portion 28, thereby loosening the wire of the coil 40, as shown in FIG. 4.

After the ends 38*a* and 38*b* of the coil 40 have been connected to the terminal portions 26 and 28 by lapping, the connected portions are soldered.

Figure 5:
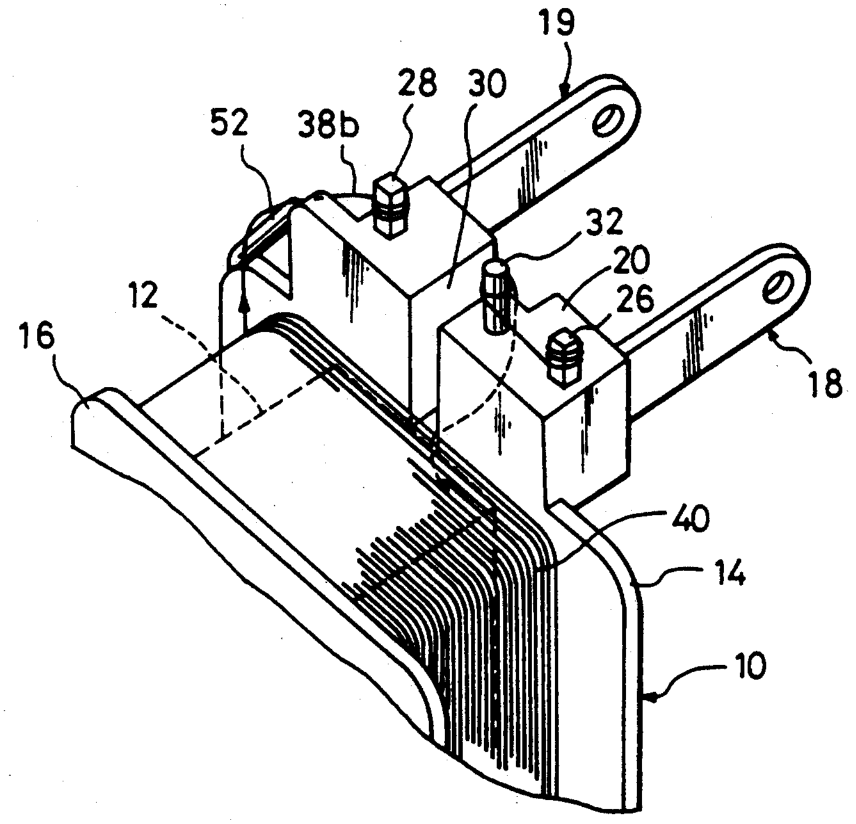
FIG. 5 is a fragmentary perspective view of a transformer having a projection in accordance with a modification of the first embodiment.

FIG. 5 is a perspective view of essential portions of a bobbin having a projection in accordance with an example of a modification of the embodiment described above.

In this example, a projection 52 is bent toward the winding end terminal 28 to loosen the winding end 38*b* of the coil 40 after winding. In this case, the material of the projection 52 is selected so that the projection 52 is not broken but can be maintained in a bent shape.

In the described embodiment, the connection portions 27 and 29 and the terminal portions 26 and 28 are formed integrally with each other. Alternatively, they may be formed separately and may be electrically connected to each other.

In the described embodiment, the projection 36 has the shape of a round rod. However, it may alternatively have a shape rectangular in section.

Further, while in the described embodiment the projection 36 is provided on an upper corner portion of the front partition wall 14, the arrangement may alternatively such that the front partition wall 14 is partially cut, and the projection 36 is provided in the cut portion.

Second Embodiment

A transformer in accordance with the second embodiment of the present invention will be described below with reference to FIGS. 6 to 8.

Figure 6:
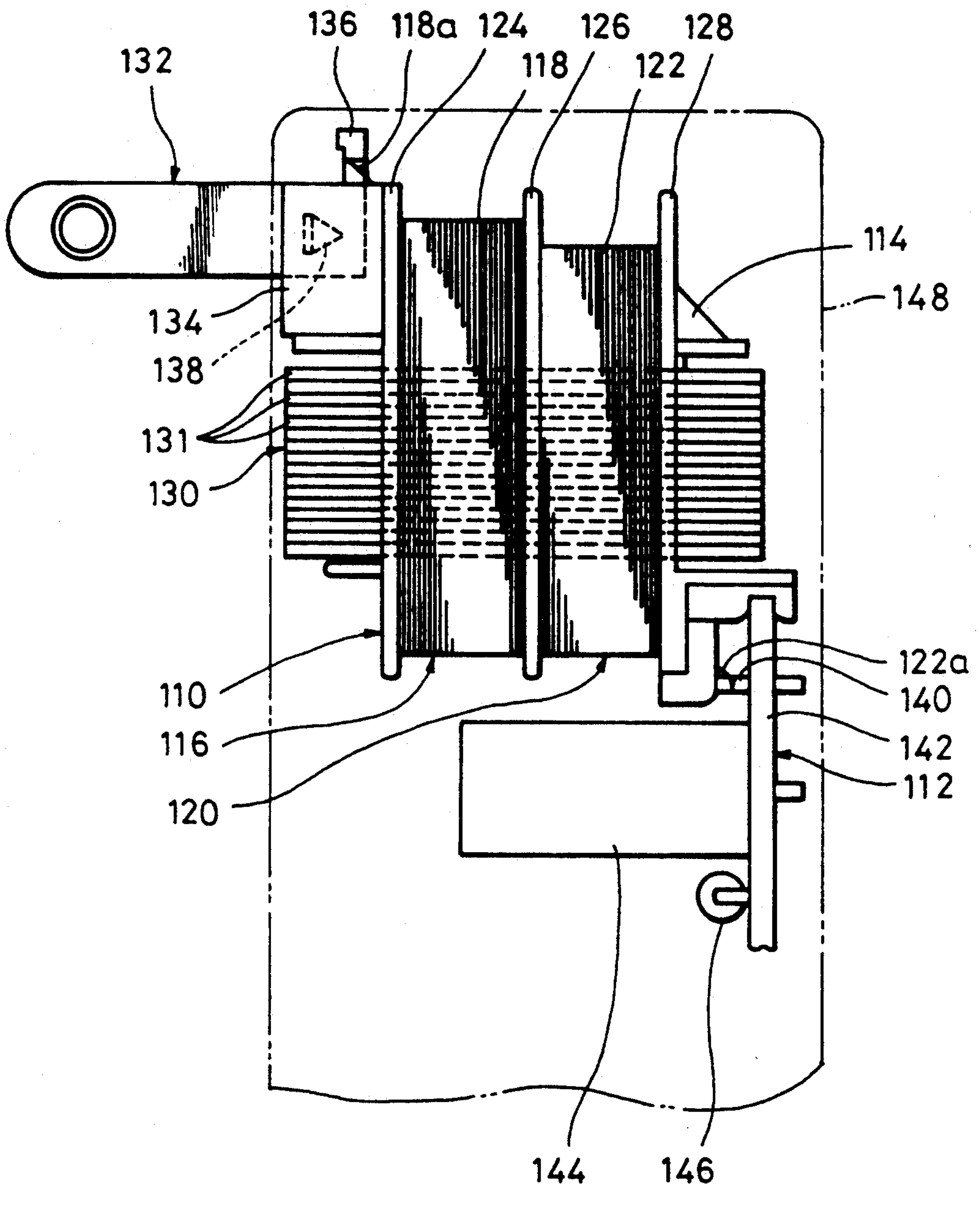
FIG. 6 is a side view of a transformer in accordance with a second embodiment of the present invention.

FIG. 6 is a side view of an adaptor having a transformer, showing only components inside a housing. This adaptor functions to convert a 100 V AC input through connection pins connected to a domestic AC power supply line into, for example, a 12 V direct current.

The transformer indicated by a number 100 in FIG. 16 serves to reduce the 100 V AC input. The alternating current voltage-reduced by the transformer 110 is converted into the direct current by a conversion means 12.

A bobbin 114 made of an insulating synthetic resin has a primary winding frame 116 around which a primary coil 118 is wound, and a secondary winding frame 120 around which a secondary winding 122 is wound. The primary winding frame 116 and the secondary winding frame 120 are arranged in series. The primary winding frame 116 is interposed between a front partition wall 124 and an intermediate partition wall 126, and the secondary winding frame 120 is interposed between the intermediate partition wall 126 and a rear partition wall 128.

A core accommodation hole is formed i the bobbin 114, i.e., through the front partition wall 124, the primary winding frame 116, the intermediate partition wall 126, the secondary winding frame 120 and the rear partition wall 128. A laminated core 130 is disposed in the core accommodation hole with its opposite ends projecting outward through two openings of the hole. Steel sheets 131 laminated to form the core 130 are insulated from each other by an insulating material. It is not always necessary to use such a laminated core, and any type of core can be used as long as the core has an electro-conductive ferromagnetic material as a main constituent, and the core may be formed of an electroconductive ferromagnetic material alone.

Figure 7:
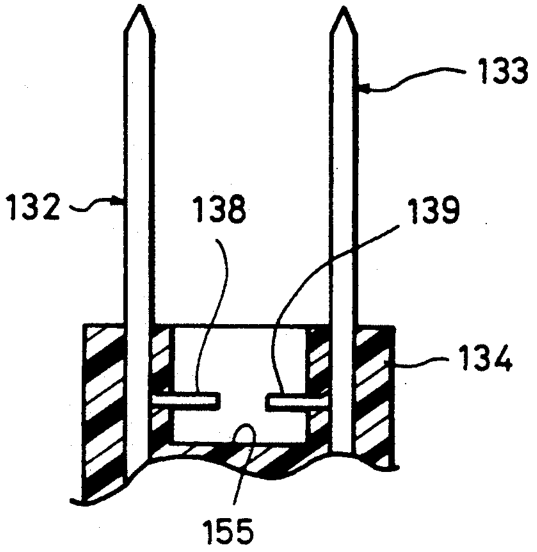
FIG. 7 is a cross-sectional view of the connection pins of the transformer shown in FIG. 6 and a portion in the vicinity of the connection pins.
Figure 8:
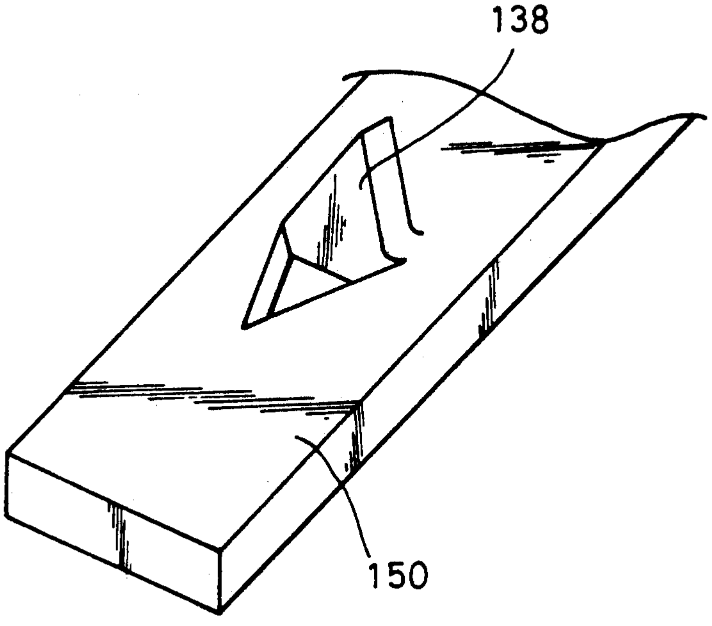
FIG. 8 is an enlarged perspective view of a portion of on of the connection pins.

The bobbin 114 is also provided with a pair of connection pins 132 and 133 (FIG. 7). A projecting support 134 in which base portions of the connection pins 132 and 133 are embedded to be fixed is provided on the front partition wall 124 at the top thereof as viewed in FIG. 6. The connection pins 132 and 133 have terminal portions 136 which project upward above the projecting support 134. An end 118*a* of the primary winding 118 is connected to the terminal portion 136 of the connection pins 132. The connection pins 132 and 133 will be described later in more detail.

Terminals 140 are provided below the rear partition wall 128. An end 122*a* of the secondary winding 122 and a circuit formed on a circuit board 142 of a converter unit 112 are connected to the termianls 140. Electronic (electric) parts 144 and 146 are provided on the circuit board 142 of the converter means 112. These components are accommodated in the housing 148 of the adaptor.

The connection pins 132 and 133 will be described below with reference to FIGS. 6 and 7. As illustrated, the connection pins 132 and 133 are disposed at a certain distance from each other (in the direction perpendicular to the plane of projection of FIG. 6 or in the horizontal direction as viewed in FIG. 7), and base portions of the pins 132 and 133 are embedded in the projecting support 134. The base portions of the connection pins 132 and 133 have discharging projections 138 and 139. The discharging projection 138 of the pin 132 extends toward the other pin 133, while the discharging projection 139 of the other pin 132 extends to toward the pin 132. The distance between the discharging pins 138 and 139 may be set to about 2.7 to 3.0 mm. In this embodiment, the discharging projections 138 and 139 (constituting a discharging means) are formed integrally with the connection pins 132 and 133 in such a manner that a portion of each of the pins 132 and 133 is bent toward the other one of these pins, i.e., inwardly. However, the discharging portions may be formed separately and fixed by welding or the like. In this embodiment, the discharging projections 138 and 139 are formed so as to have a rectangular shape whereby a discharge can be caused comparatively easily. However, the discharging projections 138 and 139 may have any other shape, e.g., a semicircular shape, a cylindrical shape or a conical shape.

Preferably, a rectangular recess 155 is formed in the projecting support 134 generally at the center as shown in FIG. 7 to cause a discharge between the discharging projections 138 and 139, that is, projecting extreme ends of the discharging projections 138 and 139 are located in the recess 155 and a discharge is caused in the recess 155.

In the adaptor having the transformer 110 constructed as described above, the projections 138 and 139 are provided on the connection pins 132 and 133, so that when a high pulse-like voltage higher than a certain level is input through the AC 100 V line by a lightning discharge or the like while the connection pins 132 and 133 are connected to the AC 100 V plug receptacle, the pulse is discharged between the discharging projections 138 and 139 and a closed circuit is formed between the projections 138 and 139. The primary and secondary coils 118 and 122 of the transformer 110, the electronic parts 144 and 146 and other components can thereby by protected from the high voltage pulse.

In the second embodiment, the discharging projections 138 and 139 are provided on the connection pins 132 and 133. However, a discharging pin may be provided one of the pair of connection pins 132 and 133 alone to achieve the desired effect.

What is claimed is:

1. A transformer comprising:
   - a bobbin having a primary winding frame and a secondary winding frame;
   - a primary coil wound around said primary winding frame;
   - a secondary coil wound around said secondary winding frame;
   - a pair of substantially parallel spaced apart connection pins electrically connected to a power source, two ends of said primary winding being electrically connected to said pair of connection pins;
   - a core mounted so as to extend through said primary and secondary winding frames; and discharge means including a transverse discharge projection provided on each of said pair of connection pins, said discharge projections extending toward and facing each other on said pair of connection pins, a discharge being thus caused between said pair of connection pins via said discharge projections when a voltage higher than a predetermined level is applied across said connection pins.

2. A transformer according to claim 1, wherein said bobbin has a front partition wall, an intermediate partition wall and a rear partition wall, said primary winding frame being provided between said front partition wall and said intermediate partition wall, said secondary winding frame being provided between said intermediate partition wall and said rear partition wall, and wherein a projecting support for supporting said pair of connection pins is provided on an upper portion of said front partition wall, a recess being formed in said projecting support, said discharging projections provided on said pair of connection pins projecting into said recess.

3. A transformer according to claim 1, wherein said discharging projections are formed by bending portions of said connection pins.

* * * * *